(12) United States Patent
Masuda (10) Patent No.: US 9,981,648 B2
(45) Date of Patent: May 29, 2018

(54) ELECTRIC BRAKE DEVICE (71) Applicant: NTN CORPORATION, Osaka-shi, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 29 days.

(21) Appl. No.: 15/356,033

(22) Filed: Nov. 18, 2016

(65) Prior Publication Data
US 2017/0066428 A1 Mar. 9, 2017

Related U.S. Application Data (63) Continuation of application No. PCT/JP2015/063779, filed on May 13, 2015.

(30) Foreign Application Priority Data

May 21, 2014 (JP) ................................. 2014-105346

(51) Int. Cl.
*B60L 7/00* (2006.01)
*B60T 17/22* (2006.01)
(Continued)

(52) U.S. Cl.
CPC ............ *B60T 17/221* (2013.01); *B60T 13/74* (2013.01); *B60T 13/741* (2013.01); *B60T 17/18* (2013.01);
(Continued)

(58) Field of Classification Search
CPC .. F16D 65/18; F16D 2066/005; F16D 66/025; F16D 2121/24; F16D 55/22; F16D 55/224; F16D 55/225; F16D 55/226
See application file for complete search history.

(56) References Cited

U.S. PATENT DOCUMENTS 7,215,090 B2 * 5/2007 Kuramochi ............... H02P 3/04
188/158
7,810,616 B2 10/2010 Nakazeki
(Continued)

FOREIGN PATENT DOCUMENTS

JP 2006-194356 7/2006
JP 2008-168662 7/2008
(Continued)

OTHER PUBLICATIONS

Extended European Search Report dated Dec. 22, 2017 in corresponding European Patent Application No. 15795339.9.
(Continued)

*Primary Examiner* — Nicholas J Lane (57) ABSTRACT

Provided is an electric brake device that is able to achieve redundancy when an abnormality occurs in a load sensor, without increasing the size of the load sensor. The electric brake device includes a brake rotor, a friction pad, an electric motor, a transmission mechanism, braking force command section, braking force estimation section, motor rotation angle detector, and a controller. The braking force estimation section includes a load sensor configured to detect elastic deformation of a determined member forming the electric brake device. The controller includes sensor abnormality detector configured to store a sensor output of the load sensor at a motor rotation angle at which a braking force becomes zero, and infer the occurrence of plastic deformation in the load sensor from transition of the stored sensor output.

8 Claims, 6 Drawing Sheets

(51) Int. Cl.
  *B60T 13/74* (2006.01)
  *B60T 17/18* (2006.01)
  *F16D 65/18* (2006.01)
  *F16D 66/00* (2006.01)
  *G01L 5/00* (2006.01)
  *H02P 15/00* (2006.01)
  *F16D 55/225* (2006.01)
  *F16D 121/24* (2012.01)

(52) U.S. Cl.
  CPC ........... *F16D 55/225* (2013.01); *F16D 65/18* (2013.01); *F16D 66/00* (2013.01); *G01L 5/00* (2013.01); *H02P 15/00* (2013.01); *F16D 2066/003* (2013.01); *F16D 2066/005* (2013.01); *F16D 2121/24* (2013.01)

(56) References Cited

U.S. PATENT DOCUMENTS

| | | | |
|---|---|---|---|
| 9,217,479 B2 | 12/2015 | Masuda et al. | |
| 9,228,648 B2 | 1/2016 | Yamasakai et al. | |
| 2005/0031056 A1* | 2/2005 | Thomas | B60T 8/885 375/343 |
| 2006/0163939 A1* | 7/2006 | Kuramochi | B60T 8/885 303/122.04 |
| 2008/0110704 A1 | 5/2008 | Nakazeki | |
| 2009/0236157 A1 | 9/2009 | Akamatsu | |
| 2011/0174581 A1* | 7/2011 | Vollert | F16D 55/22 188/72.1 |
| 2013/0327601 A1 | 12/2013 | Masuda et al. | |
| 2014/0262634 A1 | 9/2014 | Yamasakai et al. | |
| 2016/0001752 A1* | 1/2016 | Yasui | B60T 13/741 701/70 |

FOREIGN PATENT DOCUMENTS

| | | |
|---|---|---|
| JP | 2011-93333 | 5/2011 |
| JP | 2012-154482 | 8/2012 |
| JP | 2013-257000 | 12/2013 |
| WO | WO 2013/061948 A1 | 5/2013 |

OTHER PUBLICATIONS

International Preliminary Report on Patentability dated Dec. 1, 2016 in corresponding International Patent Application No. PCT/JP2015/063779.

International Search Report dated Aug. 4, 2015 in corresponding International Application No. PCT/JP2015/063779.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2015/063779, filed May 13, 2015, which is based on and claims Convention priority to Japanese patent application No. 2014-105346, filed May 21, 2014, the entire disclosure of which is herein incorporated by reference as a part of this application.

BACKGROUND OF THE INVENTION

Field of the Invention

The present invention relates to a technique to perform error detection of a load sensor of an electric brake device, and particularly relates to a technique to achieve redundancy of an electric brake device.

Description of Related Art

In conventional electric brake devices, following techniques (1) and (2) have been proposed for a load detection sensor and a linear actuator that controls a load.

(1) A technique to switch a control gain between during contact of a friction pad of an electric brake device and during non-contact of the friction pad (Patent Document 1).

(2) A technique to provide a counterforce receiving member (back plate) for receiving a counterforce when a friction pad is pressed against a brake disc, and detect a displacement of the back plate by a load sensor (Patent Document 2).

RELATED DOCUMENT

Patent Document

[Patent Document 1] JP Laid-open Patent Publication No. 2006-194356

[Patent Document 2] JP Laid-open Patent Publication No. 2012-154482

In an electric brake device using an electric actuator proposed in above technique (1) to switch the control gain, in order to accurately control a braking force at high speed, a section configured to estimate a braking force is needed in some cases. In technique (2) to detect the displacement of the back plate by the load sensor, it is difficult to strictly secure strength against repeated fatigue, so that it is necessary to set a high safety factor. Thus, the load sensor is increased in size, so that there is a possibility that the weight and the cost of the electric brake device increase.

SUMMARY OF THE INVENTION

An object of the present invention is to provide an electric brake device that is able to achieve redundancy when an abnormality occurs in a load sensor, without increasing the size of the load sensor.

Hereinafter, in order to facilitate understanding of the present invention, the present invention will be described with reference to the reference numerals in embodiments for the sake of convenience.

An electric brake device according to the present invention includes: a brake rotor 5 configured to rotate integrally with a wheel; a friction pad 6 configured to come into contact with the brake rotor 5 to generate a braking force; an electric motor 2; a transmission mechanism 4 configured to convert an output of the electric motor 2 into a pressing force of the friction pad 6; a braking force command section 26a configured to detect an operation amount of a brake operation portion 29 and to command a target braking force; a braking force estimation section 30 configured to obtain an estimated value of a braking force that presses the friction pad 6 against the brake rotor 5; a motor rotation angle detector 28 configured to detect a rotation angle of the electric motor 2; and a controller 7 configured to control the electric motor 2 in accordance with a command value and the estimated value of the braking force, wherein the braking force estimation section 30 includes a load sensor 13 configured to detect elastic deformation of a determined member forming the electric brake device, and the controller 7 includes a sensor abnormality detector 37 configured to store a sensor output of the load sensor 13 at a motor rotation angle at which the braking force becomes zero, and to infer an occurrence of plastic deformation in the load sensor 13 from transition of the stored sensor output.

For example, a part of members of the transmission mechanism 4 is used as the determined member, and the estimated value of the braking force is obtained by detecting elastic deformation of the part of the members by the load sensor 13. The "motor rotation angle at which the braking force becomes zero" is a rotation angle at which the motor rotation angle becomes equal to or less than a zero point, and the "zero point" corresponds to a motor rotation angle obtained when "zero" is commanded or set as a target braking force by the braking force command section 26a and the motor rotor rotates to this angle command position.

According to this configuration, if, for example, a load is repeatedly applied to the load sensor 13, when an origin output $V_O$ of the load sensor 13 is indicated on a vertical axis in the case where a temporal axis is set as a horizontal axis, for example, a characteristic curve of the origin output $V_O$ shifts with the number of times of repetition and elapse of time so as to gradually offset upward with a gradient relative to an origin output $V_O$ in the case without plastic deformation. The origin output $V_O$ is a sensor output of the load sensor 13 stored at a motor rotation angle at which the braking force becomes zero.

The sensor abnormality detector 37 of the controller 7 infer whether plastic deformation has occurred in the load sensor 13, from transition of the origin output $V_O$. In this case, for example, the controller 7 can perform control in which the maximum value of the braking force of the electric brake device is limited or a warning sound or warning light is outputted to a driver. Therefore, it is possible to prevent an excessive load from being applied to the load sensor 13 after plastic deformation occurs in the load sensor 13. Accordingly, it is possible to achieve redundancy when an abnormality occurs in the load sensor 13, without increasing the size of the load sensor 13.

The sensor abnormality detector 37 may include:

a zero point detection section 38 configured to estimate a zero point $\theta_0$ of the motor rotation angle at which the braking force is cancelled and a load to be applied to the load sensor 13 becomes equal to or less than zero, from a motor rotation angle $\theta_b$ detected by the motor rotation angle detector 28 when a sensor output $V_{LS}$ detected by the load sensor 13 becomes a reference output $V_b$; and a plastic deformation detection section 39 configured to store a sensor output $V_O$ detected by the load sensor 13 when the motor rotation angle shifts from the zero point $\theta_0$ to a position at which the friction pad 6 is separated from the brake rotor 5 after a determined load is applied to the load sensor 13, and to detect the occurrence of plastic deformation in the load sensor 13 from transition of the stored sensor output $V_O$.

The reference output $V_b$ can be set to any value. The sensor output $V_{LS}$ to be stored as the sensor output $V_O$ may be stored only when a load history equal to or greater than a predetermined value is applied to the load sensor 13. The determined load is determined, for example, on the basis of results of an experiment or simulation. The plastic deformation detection section 39 compares transition of the sensor output $V_O$ stored as mentioned above with a preset sensor output in the case without plastic deformation, to detect whether plastic deformation has occurred in the load sensor 13.

The load sensor 13 may be a load sensor employing a magnetic field detection method of detecting a change in a magnetic flux in a vicinity, of a pair of magnetic poles aligned so as to be inverted 180 degrees, including a boundary between the magnetic poles. The vicinity is defined, for example, as an axial range of about ±0.1 mm or less, with the boundary between two permanent magnets 13ba as a center. In the case of the load sensor 13 employing the magnetic field detection method, the sensor output changes, for example, due to a factor of a change in a temperature of the magnets, etc. However, the sensor output in the vicinity, of the pair of magnetic poles, including the boundary between the magnetic poles is not influenced by a factor of a change in the temperature of the magnets, etc. and is constant. By setting such a sensor output as a reference output $V_b$, a constant reference output $V_b$ that is not influenced by the external environment, etc. can be obtained.

The zero point detection section 38 may obtain, as the zero point, a motor rotation angle at a position at which the friction pad 6 is separated from the brake rotor 5 by a distance corresponding to a determined motor rotation angle, from a position at which a component, in a magnetic pole direction, of a magnetic field becomes zero, or a position at which a magnetic field vector is orthogonal to the magnetic pole direction. The determined motor rotation angle is determined as appropriate, for example, on the basis of results of an experiment or simulation, etc. The sensor output $V_O$ can be obtained on the basis of the obtained zero point mentioned-above of the motor rotation angle The plastic deformation detection section 39 may detect plastic deformation of the load sensor 13 by comparing at least one of the sensor output detected by the load sensor 13 at the zero point and a change amount of the sensor output detected by the load sensor 13 at the zero point each time a repetitive load is applied to the load sensor 13, with a determined value. The determined value is determined, for example, on the basis of results of an experiment or simulation, etc.

When the occurrence of plastic deformation in the load sensor 13 is detected from transition of the sensor output of the load sensor 13 at the zero point, the controller 7 may set a maximum braking force of the electric brake device to a value obtained by decreasing, by a specified amount, a maximum braking force that has been set before the plastic deformation is detected. The specified amount is determined, for example, on the basis of results of an experiment or simulation, etc.

When the occurrence of plastic deformation in the load sensor 13 is detected, the controller 7 may estimate a degree of the plastic deformation from transition of the sensor output of the load sensor 13 at the zero point, and may decrease a maximum braking force of the electric brake device as the degree increases. By performing control in which the performance of the braking force is reduced when an abnormality occurs in the load sensor 13 as in these cases, redundancy of the electric brake device can be achieved.

The controller 7 may include a use limit time estimation section 43 configured to estimate a time or a duration taken until a use limit of the load sensor 13 from transition of the sensor output of the load sensor 13 when the occurrence of plastic deformation in the load sensor 13 is detected from transition of the sensor output of the load sensor 13 at the zero point. In this case, the driver is allowed to recognize the time taken until the use limit of the load sensor 13 and go to a repair shop or the like before this time has elapsed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
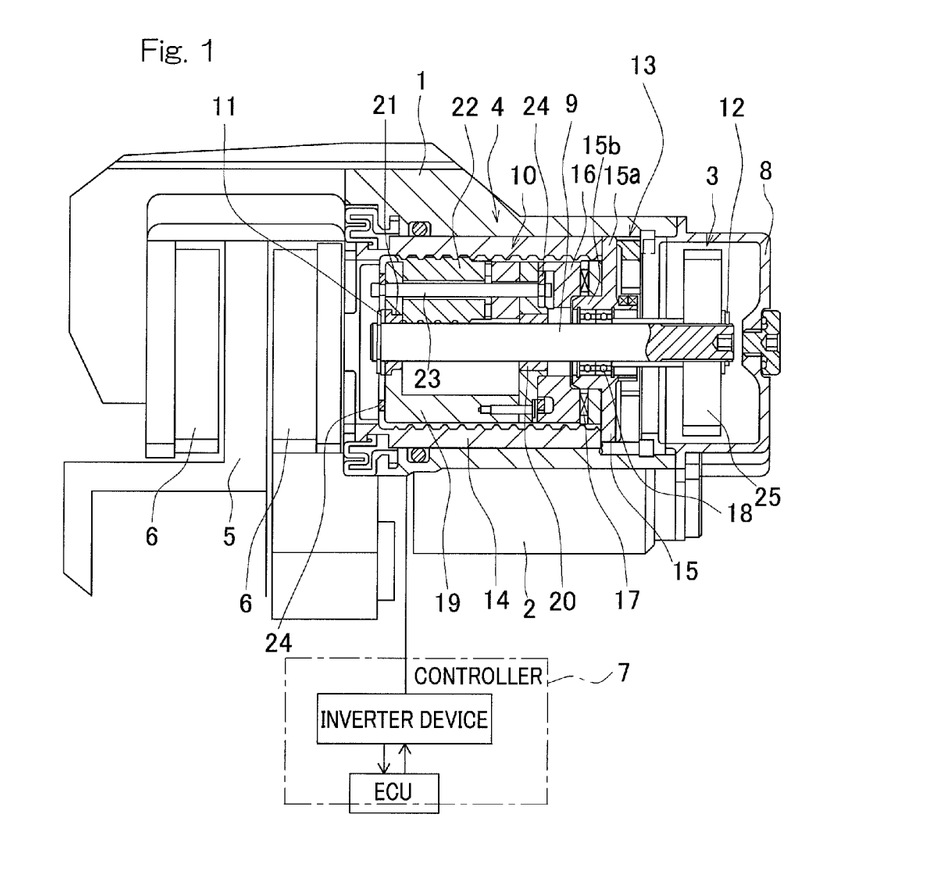
FIG. 1 is a cross-sectional view of a main part of an electric brake device according to an embodiment of the present invention.

An electric brake device according to an embodiment of the present invention will be described with reference to FIGS. 1 to 7B. As shown in FIG. 1, the electric brake device includes a housing 1, an electric motor 2, a speed reduction mechanism 3 that reduces the speed of rotation of the electric motor 2, a linear motion mechanism 4 that is a transmission mechanism, a brake rotor 5, friction pads 6, a locking mechanism that is not shown, and a controller 7 that controls the electric motor 2. The electric motor 2 is supported by the housing 1. The linear motion mechanism 4 is incorporated into the housing 1 so as to apply a braking force to the brake rotor 5 (a disc rotor in this example) by output from the electric motor 2. The housing 1 has an opening end covered by a cover 8.

The linear motion mechanism 4 will now be described. The linear motion mechanism 4 converts a rotary motion outputted from the speed reduction mechanism 3 into a linear motion and brings the friction pad 6 into contact with the brake rotor 5 or separates the friction pad 6 from the brake rotor 5. The linear motion mechanism 4 includes a rotation shaft 9 that is rotationally driven by the electric motor 2, a conversion mechanism section 10 that converts the rotary motion of the rotation shaft 9 into the linear motion, restraining sections 11 and 12, and a later-described load sensor 13. The conversion mechanism section 10 includes a linear motion portion 14, a bearing member 15, an annular thrust plate 16, a thrust bearing 17, a rolling bearing 18, a carrier 19, slide bearings 20 and 21, and a plurality of planetary rollers 22.

The linear motion portion 14 in a cylindrical shape is supported on the inner circumferential surface of the housing 1 such that the linear motion portion 14 is prevented from rotating but is movable in the axial direction. On the inner circumferential surface of the linear motion portion 14, a helical projection is helically formed so as to project by a predetermined distance in the radially inward direction. The plurality of planetary rollers 22 mesh with the helical projection.

The bearing member 15 is provided at one end side, in the axial direction, of the linear motion portion 14 in the housing 1. The bearing member 15 includes a flange portion 15*a* that extends radially outward, and a boss portion 15*b*. The plurality of rolling bearings 18 are fitted within the boss portion 15*b*, and the rotation shaft 9 is fitted onto the inner diameter surface of an inner ring of each of the rolling bearings 18. The rotation shaft 9 is rotatably supported by the bearing member 15 through the plurality of rolling bearings 18.

The carrier 19 is provided on the inner circumference of the linear motion portion 14 so as to be rotatable about the rotation shaft 9. The carrier 19 has disks that face or oppose to each other in the axial direction. The disk proximate or close to the bearing member 15 may be referred to as an inner disk, and the other disk may be referred to as an outer disk. The outer disk is provided with a distance adjustment member, projecting in the axial direction from an outer circumferential edge portion of the side surface, on a side surface facing to the inner disk. For adjusting the distances between the plurality of planetary rollers 22, a plurality of the distance adjustment members are arranged so as to be spaced equidistantly from each other in the circumferential direction. The two disks are integrated with each other by the distance adjustment members.

The inner disk is rotatably supported by the slide bearing 20 fitted between the inner disk and the rotation shaft 9. The outer disk has a shaft insertion hole formed at the center thereof and the slide bearing 21 is fitted into the shaft insertion hole. The outer disk is supported by the slide bearing 21 so as to be rotatable relative to the rotation shaft 9. The restraining sections 11 and 12 for receiving a thrust load and restraining the position of the rotation shaft 9 in the axial direction are provided on opposite end portions of the rotation shaft 9. Each of the restraining sections 11 and 12 is composed of, for example, a stopper composed of a washer or the like. Retaining rings for preventing the restraining sections 11 and 12 from being removed are provided on opposite end portions of the rotation shaft 9.

The carrier 19 has a plurality of roller shafts 23 spaced from each other in the circumferential direction. Opposite end portions of each roller shaft 23 are supported by and across the inner disk and the outer disk. That is, each of the two disks has a plurality of shaft insertion holes that are formed as oblong holes, and opposite end portions of each roller shaft 23 are inserted into the corresponding shaft insertion holes, whereby the roller shafts 23 are supported so as to be movable in the radial direction within the ranges of the length of the respective shaft insertion holes. Each of two elastic rings 24 is extended over the plurality of roller shafts 23 at opposite end portions thereof in the axial direction so as to urge the roller shafts 23 in the radially inward direction.

The planetary rollers 22 are rotatably supported by the corresponding roller shafts 23, and each planetary roller 22 is disposed between the outer circumferential surface of the rotation shaft 9 and the inner circumferential surface of the linear motion portion 14. Each planetary roller 22 is pressed against the outer circumferential surface of the rotation shaft 9 by the urging force of the elastic ring 24 extended over the plurality of roller shafts 23. By rotation of the rotation shaft 9, each planetary roller 22 that is in contact with the outer circumferential surface of the rotation shaft 9 rotates due to a contact friction therebetween. On the outer circumferential surface of each planetary roller 22, a helical groove is formed so as to mesh with the helical projection of the linear motion portion 14.

The speed reduction mechanism 3 is a mechanism that reduces a speed of rotation, or a number of rotation per unit time, of the electric motor 2 and transmits the rotation to an output gear 25 fixed to the rotation shaft 9, and the speed reduction mechanism 3 includes a plurality of gear trains (not shown). In this example, the speed reduction mechanism 3 sequentially reduces, by the above-described gear trains, the speed of rotation of an input gear (not shown) mounted to a rotor shaft (not shown) of the electric motor 2, and allows the rotation to be transmitted to the output gear 25. The locking mechanism is provided within the speed reduction mechanism 3 and is configured to be able to switch between: a locking state in which a braking force reducing operation of the linear motion mechanism 4 is inhibited; and an unlocking state in which the braking force reducing operation is allowed.

The load sensor 13 will now be described. The load sensor 13 obtains an estimated value of the braking force that presses the friction pad 6 against the brake rotor 5. The load sensor 13 is provided in order to accurately control the braking force. A magnetic sensor is used as the load sensor 13. However, an optical, eddy current type, or capacitance type sensor other than a magnetic type may be used as the load sensor 13.

Figure 2:
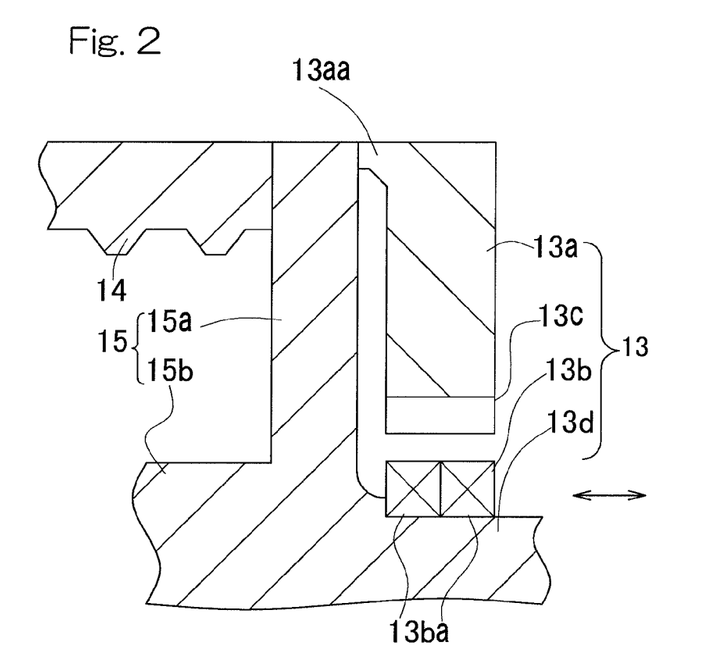
FIG. 2 is a cross-sectional view showing a load sensor of the electric brake device in an enlarged manner.

As shown in FIG. 2, the load sensor 13 includes a flange member 13*a*, a magnetic target 13*b*, a support member 13*d* that supports the magnetic target 13*b*, and a sensor 13*c* that is of a magnetic type in the present embodiment. The flange member 13*a* is a ring-shaped member provided at the inboard side of the bearing member 15, and an annular projection 13*aa* is provided at an outboard-side end of the flange member 13*a* so as to project in the axial direction and be in contact with the flange portion 15*a* of the bearing member 15.

As shown in FIGS. 1 and 2, when the friction pad 6 presses the brake rotor 5, a counterforce toward the inboard side acts on the linear motion portion 14. The counterforce is transmitted through the planetary rollers 22, the thrust plate 16, and the thrust bearing 17, etc., to the bearing member 15. Accordingly, an inner circumferential portion of the flange portion 15a and the boss portion 15b of the bearing member 15 are displaced in the axial direction with an outer circumferential portion of the flange portion 15a as a fulcrum.

The support member 13d is composed of a cylindrical portion extending from the inner circumferential portion of the flange portion 15a toward the inboard side. The magnetic target 13b is provided on the outer circumference of the support member 13d. The magnetic target 13b includes, for example, two permanent magnets 13ba, 13ba. In each of these permanent magnets 13ba, 13ba, a direction (the radial direction in this example) orthogonal to the axial direction, which is the direction of a relative displacement between the magnetic target 13b and the magnetic sensor 13c, is defined as a magnetization direction. The permanent magnets 13ba, 13ba are a magnetic pole pair of magnetic poles having polarities opposite to each other, that is, an N pole and an S pole aligned, in the axial direction.

The magnetic sensor 13c is provided on the inner circumference of the flange member 13a. The magnetic sensor 13c is disposed near, proximate or close to the boundary (FIG. 3A) between the two permanent magnets 13ba, 13ba so as to face to the magnetic target 13b in the radial direction. For example, a Hall IC, a magnetoresistive element, or a magnetic impedance element, etc. is used as the magnetic sensor 13c.

When the load sensor 13 is in a normal state, if the counterforce of the braking force is transmitted to the flange member 13a, the magnetic target 13b and the magnetic sensor 13c are displaced relative to each other in the axial direction due to elastic deformation of an inner circumferential portion of the flange member 13a. In response to the amount of the relative displacement, an output signal of the magnetic sensor 13c, that is, a sensor output of the load sensor 13, changes. When the braking force is cancelled, the relative position, in the axial direction, of the magnetic target 13b relative to the magnetic sensor 13c goes back to the initial position (the position during non-operation of the brake) due to elastic return of the flange member 13a. By setting beforehand a relationship between the counterforce of the braking force acting on the flange member 13a and the sensor output, a braking force can be estimated on the basis of the sensor output of the load sensor 13.

Figure 3A:
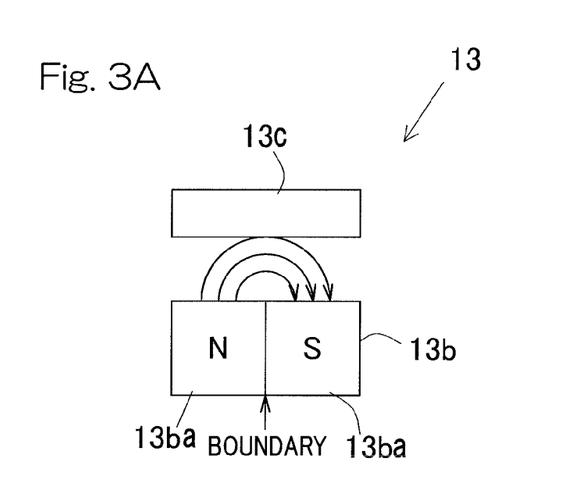
FIG. 3A is a diagram illustrating an example of detection by the load sensor.
Figure 3B:
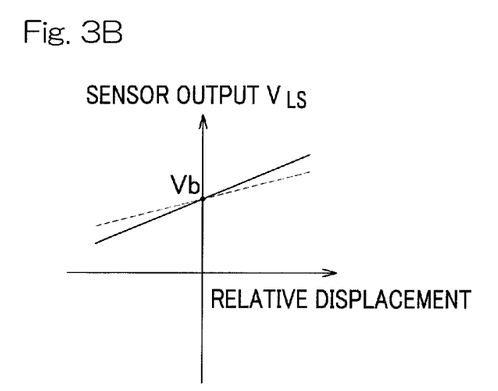
FIG. 3B is a schematic diagram showing a relationship between a sensor output of the load sensor and a relative displacement between a magnetic target and a magnetic sensor.

FIG. 3A is a diagram illustrating an example of detection by the load sensor 13 of the electric brake device, and FIG. 3B is a diagram schematically showing a relationship between the sensor output of the load sensor and relative displacement between the magnetic target and the magnetic sensor. A description will be given also with reference to FIGS. 1 and 2. As shown in FIG. 3A, the load sensor 13 employs a magnetic field detection method of detecting a change in a magnetic flux in the vicinity, of the pair of magnetic poles aligned so as to be inverted 180 degrees, including the boundary between the magnetic poles.

In the case of the load sensor 13 employing such a magnetic field detection method, the sensor output changes as shown by a dotted line in FIG. 3B, for example, due to a factor of a change in the temperature of the permanent magnets 13ba. However, the sensor output in the vicinity of the pair of magnetic poles, which vicinity includes the boundary between the magnetic poles, is not influenced by a factor of a change in the temperature of the permanent magnets 13ba and is constant. By setting such a sensor output as a later-described reference output $V_b$, a constant reference output $V_b$ that is not influenced by the external environment, etc. is obtained.

Figure 4:
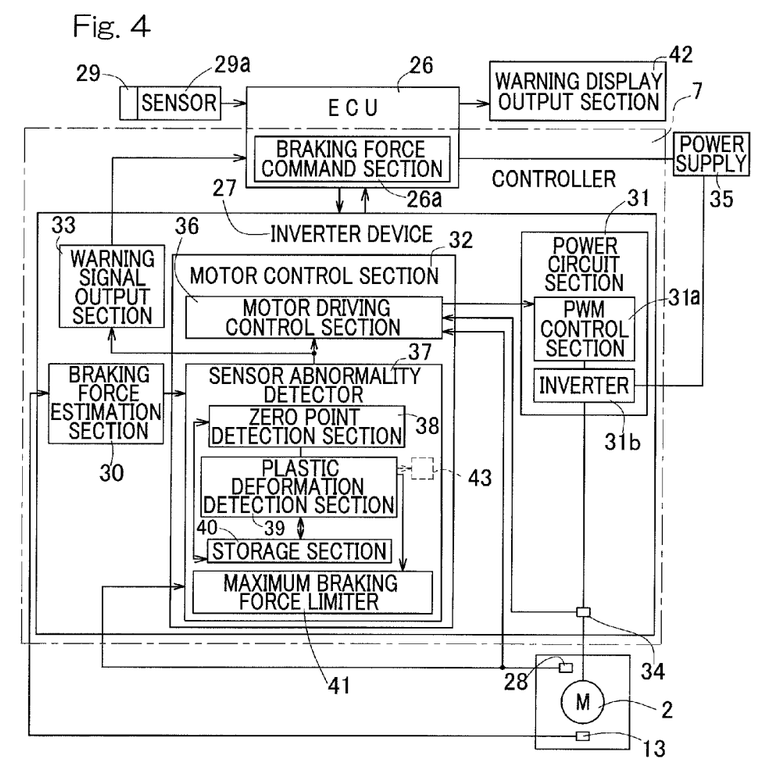
FIG. 4 is a block diagram of a control system of the electric brake device.

FIG. 4 is a block diagram of a control system of the electric brake device. The controller 7 of the electric brake device includes a braking force command section 26a provided in an ECU 26, and an inverter device 27. As the ECU 26 that is a higher-order control unit of the inverter device 27, an electric control unit that performs overall control of a vehicle is applied, for example. In response to an output from a sensor 29a that varies according to the operation amount of a brake pedal that is a brake operation portion 29, the braking force command section 26a generates and outputs a command value of a target braking force by using a look up table (LUT) implemented by software or hardware and a predetermined transform function contained in a library of software, or hardware equivalent to this, etc. The brake operation portion 29 is not limited to the above pedal input device, and may be button input device or lever input device as long as it is used by an operator to provide an instruction to apply a brake.

The inverter device 27 includes: a braking force estimation section 30 that obtains an estimated value of the braking force that presses the friction pad 6 (FIG. 1) against the brake rotor 5 (FIG. 1); a power circuit section 31 provided for each electric motor 2; a motor control section 32 that controls the power circuit section 31; a warning signal output section 33; and a current detector 34. The braking force estimation section 30 includes the load sensor 13. The braking force estimation section 30 includes relationship setting section in which a relationship between the counterforce of the braking force and the sensor output of the load sensor 13 is set in a table or the like. The braking force estimation section 30 can estimate a braking force by checking or collating the sensor output from the load sensor 13 against the relationship setting section. Other than being configured to check the sensor output against the relationship setting section, the braking force estimation section 30 may be configured with a circuit or function with which a braking force can be calculated from the sensor output by using a predetermined transform function contained in a library of software, or hardware equivalent to this, etc.

The motor control section 32 is composed of: a computer including a processor; and other electronic circuits such as a read only memory (ROM) including a program to be executed by the processor, a random access memory (RAM), and a co-processor. According to the command value of the braking force provided from the braking force command section 26a and the estimated value of the braking force estimated by the braking force estimation section 30, the motor control section 32 converts these values into a current command as a voltage value, and provides the current command to the power circuit section 31. The motor control section 32 has a function to output, to the ECU 26, various types of information such as detected values and control values for the electric motor 2.

The power circuit section 31 includes: an inverter 31b that converts DC power from a power supply 35 to three-phase AC power that is to be used for driving the electric motor 2; and a PWM control section 31a that controls the inverter 31b. The electric motor 2 is composed of a three-phase synchronous motor or the like. The electric motor 2 is provided with a motor rotation angle detector 28 that detects a rotation angle of a rotor (not shown). The inverter 31b includes a plurality of semiconductor switching elements (not shown), and the PWM control section 31a performs pulse width modulation of the inputted current command and provides an on/off command to each of the semiconductor switching elements.

The motor control section 32 includes a motor driving control section 36 as a basic control section thereof. According to the above-described command value and estimated value of the braking force, the motor driving control section 36 converts these values into a current command represented by a voltage value and provides a motor operation command value including the current command to the PWM control section 31*a* of the power circuit section 31. The motor driving control section 36 obtains, from the current detector 34, a motor current applied from the inverter 31*b* to the electric motor 2 and performs current feedback control for the command value of the braking force. In addition, the motor driving control section 36 obtains a rotation angle of the rotor (not shown) of the electric motor 2, that is, a motor rotation angle, from the motor rotation angle detector 28, and provides the current command to the PWM control section 31*a* such that efficient motor driving corresponding to the motor rotation angle is enabled.

The motor control section 32 is provided with sensor abnormality detector 37. The sensor abnormality detector 37 stores the sensor output of the load sensor 13 at a motor rotation angle at which the braking force becomes zero, and infers an occurrence of plastic deformation in the flange member 13*a* (FIG. 2) of the load sensor 13 from transition of the stored sensor output. During a time when the friction pad 6 (FIG. 1) moves away from the brake rotor 5 (FIG. 1) after the braking force becomes zero, an sensor output is present at the load sensor 13 due to a frictional force of the linear motion mechanism 4 (FIG. 1) or an elastic force of the flange member 13*a* (FIG. 2), etc. The sensor abnormality detector 37 infers the occurrence of plastic deformation in the load sensor 13 from transition of this sensor output. The "motor rotation angle at which the braking force becomes zero" is a rotation angle at which the motor rotation angle becomes equal to or less than a zero point, and the "zero point" corresponds to a motor rotation angle obtained when the value "zero" is commanded as a target braking force by the braking force command section 26*a* and the motor rotor rotates to this angle command position. The sensor abnormality detector 37 includes a zero point detection section 38, a plastic deformation detection section 39, a storage section 40, and a maximum braking force limiter 41.

Without being influenced by temperature change, the zero point detection section 38 estimates a zero point $\theta_0$ of the motor rotation angle at which the braking force is cancelled and a load to be applied to the load sensor 13 becomes equal to or less than zero, from a motor rotation angle $\theta_b$ detected by the motor rotation angle detector 28 when a sensor output $V_{LS}$ detected by the load sensor 13 becomes the reference output $V_b$. The zero point detection section 38 is configured with a circuit or function with which the zero point $\theta_0$ of the motor rotation angle can be calculated from the motor rotation angle $\theta_b$, by using a LUT implemented by software or hardware and a predetermined transform function contained in a library of software, or hardware equivalent to this, etc.

After a determined load is applied to the load sensor 13, the plastic deformation detection section 39 stores, in the storage section 40 such as a memory, the sensor output detected by the load sensor 13 when the motor rotation angle shifts from the zero point $\theta_0$ to a position at which the friction pad 6 (FIG. 1) is separated from the brake rotor 5 (FIG. 1). The plastic deformation detection section 39 detects the occurrence of plastic deformation in the load sensor 13 from transition of the stored sensor output. The plastic deformation detection section 39 is configured with a circuit or function with which, for example, later-described calculation by a least square method for detecting the occurrence of plastic deformation in the load sensor 13 from transition of the stored sensor output is enabled, by using a LUT implemented by software or hardware and a predetermined transform function contained in a library of software, or hardware equivalent to this, etc. When the occurrence of plastic deformation in the load sensor 13 is detected by the plastic deformation detection section 39, the maximum braking force limiter 41 sets the maximum braking force of the electric brake device to a value obtained by decreasing, by a specified amount, the maximum braking force that has been set before the plastic deformation is detected.

The inverter device 27 is provided with the warning signal output section 33. When the occurrence of plastic deformation in the load sensor 13 is detected by the plastic deformation detection section 39, the warning signal output section 33 outputs a warning signal to the ECU 26. A console panel or the like of the vehicle is provided with a warning output section 42 such as a display, a warning lamp, or an audio output device. When the warning signal is inputted from the warning signal output section 33, the ECU 26 causes the warning output section 42 to output a warning display or the like. The outputted warning display or the like allows a driver of the vehicle to recognize that an abnormality has occurred in the load sensor 13.

Figure 5:
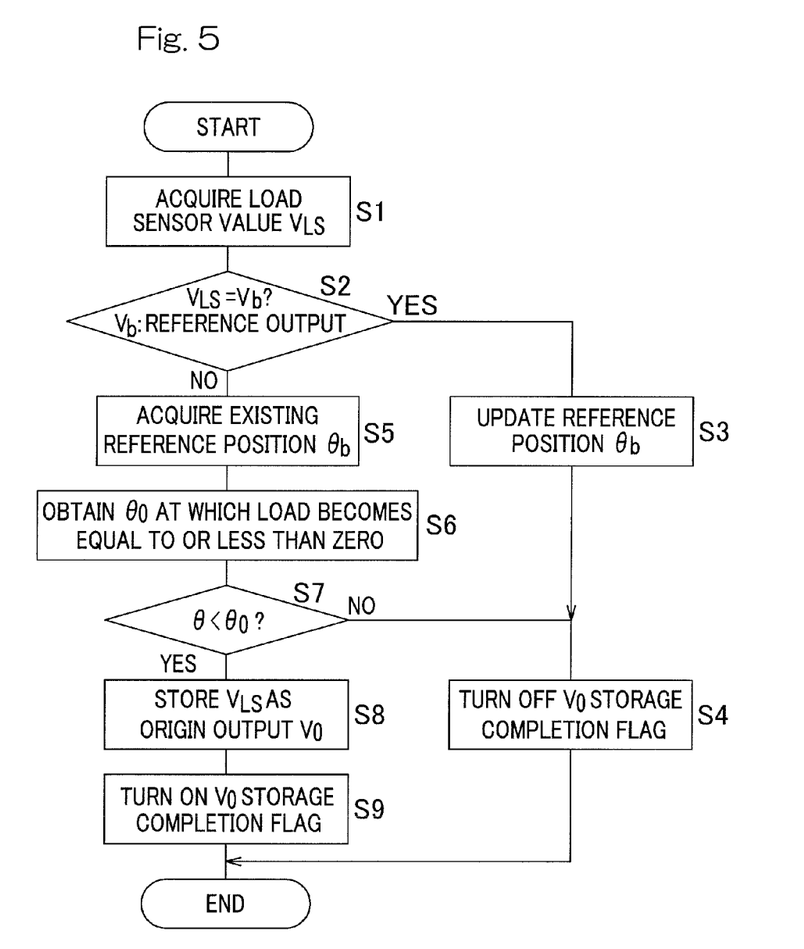
FIG. 5 is a flowchart showing a process of storing the sensor output of the electric brake device, etc.

FIG. 5 is a flowchart showing a process of storing the sensor output of the electric brake device, etc. Hereinafter, a description will be given also with reference to FIGS. 1 to 4 as necessary. For example, the vehicle is powered on, the present process is started, and the storage section 40 of the sensor abnormality detector 37 temporarily acquires the sensor output $V_{LS}$ detected by the load sensor 13 (step S1). Next, the zero point detection section 38 determines whether the detected sensor output $V_{LS}$ has become the reference output $V_b$ (step S2).

When the sensor output $V_{LS}$ has become the reference output $V_b$ (step S2: yes), the zero point detection section 38 updates and stores the motor rotation angle $\theta_b$ detected by the motor rotation angle detector 28, as a reference position in the storage section 40 (step S3). Thereafter, the plastic deformation detection section 39 sets a flag representing that storing a sensor output $V_0$, which is an origin output, in the storage section 40 has not been completed. Specifically, the plastic deformation detection section 39 turns off a $V_0$ storage completion flag (step S4). Then, the process is ended once, and goes back to step S1 again.

When the sensor output $V_{LS}$ has not been the reference output $V_b$ (step S2: no), the zero point detection section 38 reads and acquires the already-stored motor rotation angle $\theta_b$, which is the reference position, from the storage section 40 (step S5). Next, the zero point detection section 38 calculates a motor rotation angle $\theta_0$ at which a load to be applied to the load sensor 13 becomes equal to or less than zero (step S6). Next, the plastic deformation detection section 39 determines whether a motor rotation angle $\theta$ detected by the motor rotation angle detector 28 is smaller than the motor rotation angle $\theta_0$ (step S7). That is, the plastic deformation detection section 39 determines whether the motor rotation angle $\theta$ has shifted from the zero point $\theta_0$ to a position at which the friction pad 6 is separated from the brake rotor 5.

When the motor rotation angle $\theta$ is equal to or larger than the motor rotation angle $\theta_0$ (step S7: no), the process proceeds to step S4 and is ended once, and then goes back to step S1 again. When the motor rotation angle θ is smaller than the motor rotation angle $θ_0$ (step S7: yes), the plastic deformation detection section 39 stores the sensor output $V_{LS}$ as the origin output $V_O$ in the storage section 40 (step S8). Next, the plastic deformation detection section 39 sets the flag representing that storing the sensor output $V_O$, which is the origin output, in the storage section 40 has been completed (step S9). Thereafter, the present process is ended.

Figure 6:
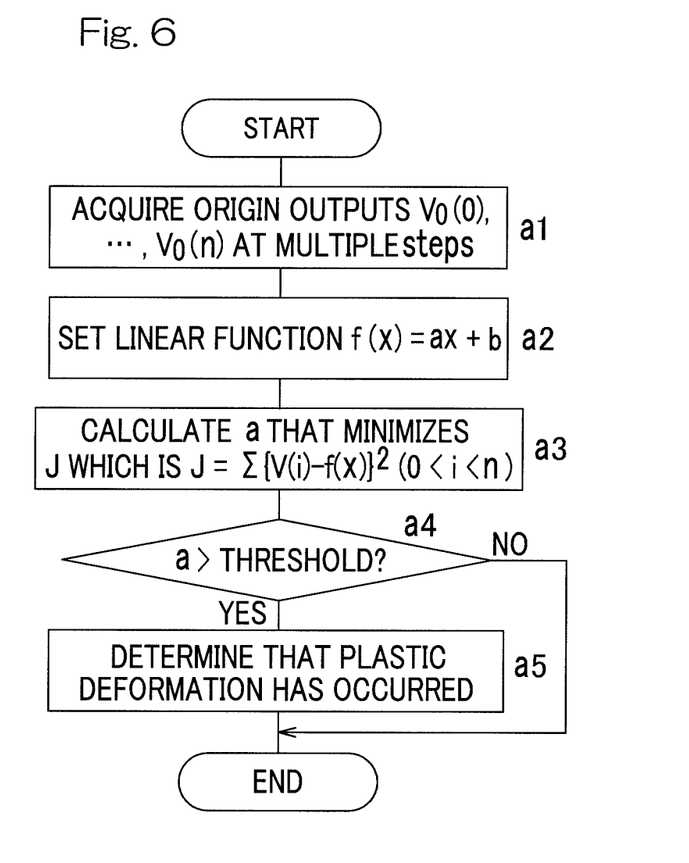
FIG. 6 is a flowchart showing an example in which plastic deformation of the load sensor is detected on the basis of the stored sensor output in the electric brake device.

FIG. 6 is a flowchart showing an example in which plastic deformation of the load sensor 13 is detected by using the stored sensor output $V_O$ in the electric brake device. After the present process is started, the plastic deformation detection section 39 acquires, from the storage section 40, origin outputs $V_O(0), \ldots, V_O(n)$ at multiple (n) steps in which load application to the load sensor 13 is repeated (step a1). Next, the plastic deformation detection section 39 sets a linear function f(x)=ax+b (step a2). In the linear function, "a" represents the change amount (gradient) of the multiple sensor outputs $V_O$, and "b" is a constant.

Next, the plastic deformation detection section 39 calculates the gradient "a" by using a least square method. For example, the plastic deformation detection section 39 calculates the gradient "a" that minimizes J which is $J=Σ\{V(i)−f(x)\}^2$ wherein 0<i<n (step a3). Next, the plastic deformation detection section 39 compares the gradient "a" to a threshold (determined value) and determines whether the gradient "a" is greater than the threshold (step a4). When the gradient "a" is determined to be equal to or less than the threshold (step a4: no), the present process is ended.

When the gradient "a" is determined to be greater than the threshold (step a4: yes), the plastic deformation detection section 39 determines that plastic deformation has occurred in the load sensor 13 (step a5). Then, the present process is ended. In this example, the calculation of the gradient "a" by the least square method is shown. However, for example, the median value and the deviation of the sensor outputs $V_O$ may be set in advance, and the sensor outputs $V_O$ may be directly compared to this value.

Figure 7A:
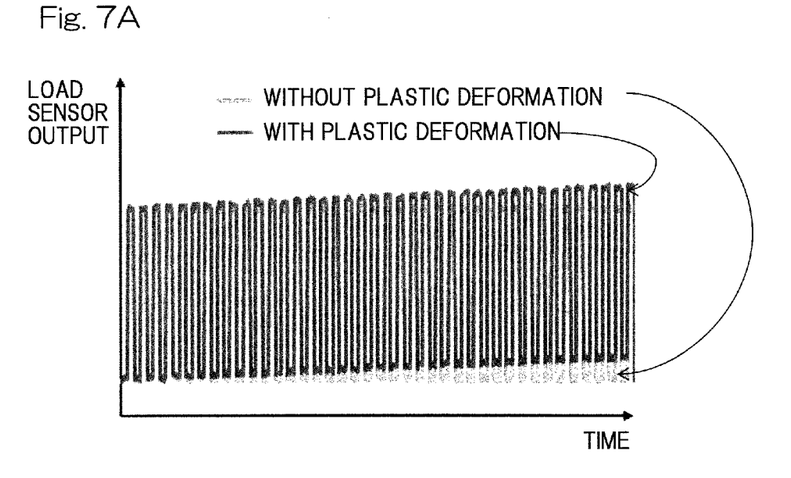
FIG. 7A is a diagram conceptually showing transitions of the sensor output in the case where plastic deformation does not occur in the load sensor and in the case where plastic deformation occurs in the load sensor, respectively.

FIG. 7A is a diagram conceptually showing transitions of the sensor output (vertical axis) in the case where plastic deformation does not occur in the load sensor and in the case where plastic deformation occurs in the load sensor, respectively. In FIG. 7A, the origin of "time" on the horizontal axis is set as a time at which the plastic deformation starts in the load sensor. When a load is repeatedly applied to the load sensor, the sensor output of the load sensor with the plastic deformation shifts over time so as to gradually drift upward relative to the sensor output of the load sensor without plastic deformation.

Figure 7B:
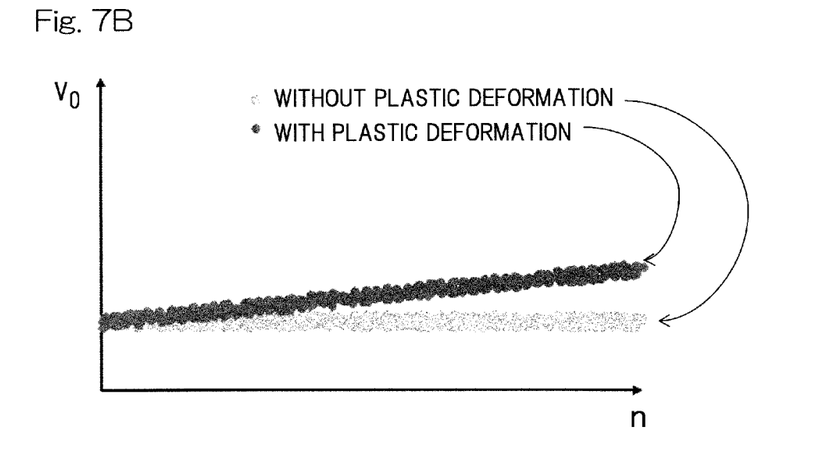
FIG. 7B is a diagram showing transitions of the stored sensor output in the case where plastic deformation does not occur and in the case where plastic deformation occurs, respectively.

FIG. 7B is a diagram showing transitions of the stored sensor output $V_O$ (vertical axis) in the case with plastic deformation and in the case without plastic deformation, respectively. In FIG. 7B, the origin of the number of times "n" of repetition of load application to the load sensor, on the horizontal axis, is set as the number of times at which the plastic deformation starts in the load sensor. When a load is repeatedly applied to the load sensor, the sensor output $V_O$ of the load sensor with the plastic deformation shifts with increase of the number of times n of repetition so as to gradually offset upward with the gradient a relative to the sensor output $V_O$ in the case without plastic deformation. Therefore, as shown in FIG. 6 described above, it is possible to detect the occurrence of plastic deformation in the load sensor.

According to the electric brake device described above, the sensor abnormality detector 37 of the controller 7 infers whether plastic deformation has occurred in the load sensor 13, from transition of the sensor output $V_O$. When the occurrence of plastic deformation in the load sensor 13 is detected by the plastic deformation detection section 39, the warning signal output section 33 outputs a warning signal to the ECU 26. When a warning signal is inputted from the warning signal output section 33, the ECU 26 causes the warning output section 42 to output a warning display or the like. The outputted warning display or the like allows the driver of the vehicle to recognize that an abnormality has occurred in the load sensor 13.

When the occurrence of plastic deformation in the load sensor 13 is detected by the plastic deformation detection section 39, the maximum braking force limiter 41 sets the maximum braking force of the electric brake device to a value obtained by decreasing, by a specified amount, the maximum braking force that has been set before the plastic deformation is detected.

As described above, the controller 7 can perform control in which the maximum value of the braking force is limited or a warning sound or warning light is outputted to the driver. Therefore, it is possible to prevent an excessive load from being applied to the load sensor 13 after plastic deformation occurs in the load sensor 13. Accordingly, it is possible to achieve redundancy when an abnormality occurs in the load sensor 13, without increasing the size of the load sensor 13.

Another embodiment will now be described. When the occurrence of plastic deformation in the load sensor 13 is detected by the plastic deformation detection section 39, the maximum braking force limiter 41 may estimate the degree of the plastic deformation from transition of the sensor output of the load sensor 13 at the zero point, and may decrease the maximum braking force of the electric brake device as the degree increases.

As shown in FIG. 4, the sensor abnormality detector 37 may include a use limit time estimation section 43 that estimates a time taken until the use limit of the load sensor 13 when the occurrence of plastic deformation in the load sensor 13 is detected by the plastic deformation detection section 39. The use limit time estimation section 43 is configured with a circuit or function with which the time taken until the use limit can be calculated, by using a LUT implemented by software or hardware and a predetermined transform function contained in a library of software, or hardware equivalent to this, etc. When a warning signal is inputted from the warning signal output section 33, the ECU 26 outputs the time taken until the use limit of the load sensor 13, to the warning output section 42. In this case, the driver is allowed to recognize the time taken until the use limit of the load sensor 13 and go to a repair shop or the like before this time has elapsed. In reverse to the example in FIG. 2, in the load sensor 13, the magnetic target 13b may be provided on the inner circumference of the flange member 13a and the magnetic sensor 13c may be provided on the outer circumference of the support member 13d.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . electric motor
4 . . . linear motion mechanism (transmission mechanism)
5 . . . brake rotor
6 . . . friction pad
7 . . . controller
13 . . . load sensor
26a . . . braking force command section
28 . . . motor rotation angle detector
29 . . . brake operation portion
30 . . . braking force estimation section
37 . . . sensor abnormality detector
38 . . . zero point detection section
39 . . . plastic deformation detection section
41 . . . maximum braking force limiter
43 . . . use limit time estimation section

What is claimed is:

1. An electric brake device comprising:
a brake rotor configured to rotate integrally with a wheel;
a friction pad configured to come into contact with the brake rotor to generate a braking force;
an electric motor;
a transmission mechanism configured to convert an output of the electric motor into a pressing force of the friction pad;
a braking force command section configured to detect an operation amount of a brake operation portion and to command a target braking force;
a braking force estimation section configured to obtain an estimated value of a braking force that presses the friction pad against the brake rotor;
a motor rotation angle detector configured to detect a rotation angle of the electric motor; and
a controller configured to control the electric motor in accordance with a command value and the estimated value of the braking force, wherein
the braking force estimation section includes a load sensor configured to detect elastic deformation of a determined member forming the electric brake device, and
the controller includes a sensor abnormality detector configured to store a sensor output of the load sensor at a motor rotation angle at which the braking force becomes zero, and to infer an occurrence of plastic deformation in the load sensor from transition of the stored sensor output.

2. The electric brake device as claimed in claim 1, wherein the sensor abnormality detector includes:
a zero point detection section configured to estimate a zero point of the motor rotation angle at which the braking force is cancelled and a load to be applied to the load sensor becomes equal to or less than zero, from a motor rotation angle detected by the motor rotation angle detector when a sensor output detected by the load sensor becomes a reference output; and
a plastic deformation detection section configured to store a sensor output detected by the load sensor when the motor rotation angle shifts from the zero point to a position at which the friction pad is separated from the brake rotor after a determined load is applied to the load sensor, and to detect the occurrence of plastic deformation in the load sensor from transition of the stored sensor output.

3. The electric brake device as claimed in claim 2, wherein the load sensor is a load sensor employing a magnetic field detection method of detecting a change in a magnetic flux in a vicinity, of a pair of magnetic poles aligned so as to be inverted 180 degrees, including a boundary between the magnetic poles.

4. The electric brake device as claimed in claim 3, wherein the zero point detection section obtains, as the zero point, a motor rotation angle at a position at which the friction pad is separated from the brake rotor by a distance corresponding to a determined motor rotation angle, from a position at which a component, in a magnetic pole direction, of a magnetic field becomes zero, or a position at which a magnetic field vector is orthogonal to the magnetic pole direction.

5. The electric brake device as claimed in claim 2, wherein the plastic deformation detection section detects plastic deformation of the load sensor by comparing at least one of the sensor output detected by the load sensor at the zero point and a change amount of the sensor output detected by the load sensor at the zero point each time a repetitive load is applied to the load sensor, with a determined value.

6. The electric brake device as claimed in claim 2, wherein, when the occurrence of plastic deformation in the load sensor is detected from transition of the sensor output of the load sensor at the zero point, the controller sets a maximum braking force of the electric brake device to a value obtained by decreasing, by a specified amount, a maximum braking force that has been set before the plastic deformation is detected.

7. The electric brake device as claimed in claim 2, wherein, when the occurrence of plastic deformation in the load sensor is detected, the controller estimates a degree of the plastic deformation from transition of the sensor output of the load sensor at the zero point, and decreases a maximum braking force of the electric brake device as the degree increases.

8. The electric brake device as claimed in claim 2, wherein the controller includes a use limit time estimation section configured to estimate a time taken until a use limit of the load sensor from transition of the sensor output of the load sensor when the occurrence of plastic deformation in the load sensor is detected from transition of the sensor output of the load sensor at the zero point.

* * * * *